United States Patent [19]

Schwarz et al.

[11] Patent Number: 5,302,885
[45] Date of Patent: Apr. 12, 1994

[54] STARTING DEVICE FOR A SINGLE PHASE INDUCTION MOTOR

[75] Inventors: Marcos G. Schwarz; Egidio Berwanger, both of Joinville, Brazil

[73] Assignee: Empresa Brasileira de Compressores S.A.-Embraco, Joinville-SC, Brazil

[21] Appl. No.: 827,206

[22] Filed: Jan. 29, 1992

[30] Foreign Application Priority Data

Jan. 30, 1991 [BR] Brazil ............................ PI9100477

[51] Int. Cl.$^5$ ............................................. H02P 1/44
[52] U.S. Cl. ..................................... 318/781; 318/784; 318/785
[58] Field of Search ............... 318/786, 817, 775, 781, 318/778, 816, 812, 809, 784

[56] References Cited

U.S. PATENT DOCUMENTS

| | | | |
|---|---|---|---|
| 3,596,158 | 7/1971 | Waltrous | 318/809 |
| 4,431,958 | 2/1984 | Schutten et al. | 318/812 |
| 4,568,195 | 4/1987 | Min | 318/786 |
| 4,804,901 | 2/1989 | Pertessis et al. | 318/786 |
| 5,051,681 | 9/1991 | Schwarz | 318/781 |
| 5,077,512 | 12/1991 | Weber | 318/775 |

Primary Examiner—William M. Shoop, Jr.
Assistant Examiner—John W. Cabeca
Attorney, Agent, or Firm—Darby & Darby

[57] ABSTRACT

A starting device for a single phase induction motor, of the type having a cage type rotor and a stator having at least one main coil and one starting coil, which is connected in series with first and second terminals of an alternating current source. The starting device comprises a relay (RL) having at least one contact, with one of the terminals thereof being connected to the first terminal (1) of the alternating current source (F), while the other terminal of said contact is connected to the terminal of the starting coil (L2); and a coil (B) for actuating the relay; an electronic timer circuit (T), which is connected to the terminals of the coil (B) for actuating the relay (RL), in order to open the contact of the latter by supplying a current to the coil (B) thereof, thereby finishing the starting operation of the motor (M), after a period of time has elapsed from the motor (M) powering up. In case the motor includes a permanent capacitor (CP), said capacitor will be connected in series with a starting coil (L2) between the terminal of the latter and the first terminal (1) of the alternating current source.

21 Claims, 4 Drawing Sheets

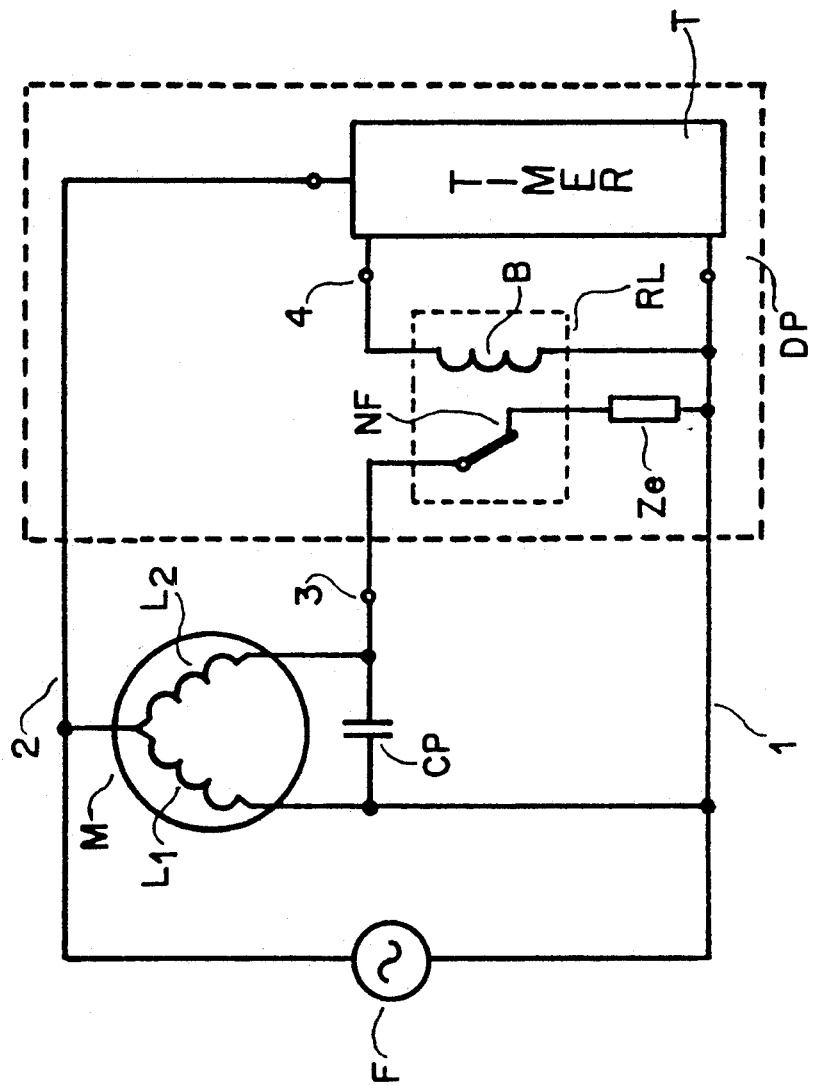

STARTING DEVICE FOR A SINGLE PHASE INDUCTION MOTOR

FIELD OF THE INVENTION

The present invention refers to a single phase induction motor and, more specifically, to a starting device for this type of motor.

BACKGROUND OF THE INVENTION

Single phase induction motors have been widely used due to their construction simplicity, rigidity and reliability. They are useful for low power range applications, such as hermetic refrigeration compressors, washing machine motors, pumps and some industrial applications.

Single phase induction motors are essentially composed of a cage type rotor and a stator winding, basically two windings, one for the main winding and the other for the starting winding.

When an alternating voltage source is applied only to the main winding of a single phase induction motor, a magnetic field fixed in space and alternating in amplitude is created, but which does not develop any torque to start the rotor movement. Thus, it is necessary to create a rotating magnetic field to take the rotor from the static condition, so that the starting is initiated.

Such rotating field is achieved by supplying the starting winding with a current which is phase-displaced in relation to the current flowing in the main winding and at an angle as near as possible to 90°.

The phase displacement of the current in the starting winding in relation to the current in the main winding, can be achieved by construction differences, such as by designing the starting winding with a power factor higher than that of the main winding, or by inserting an external impedance connected in series to the starting winding, the impedance usually being a resistor or a capacitor.

Therefore, it is necessary to install a device in series with the starting winding circuit which temporarily connects this circuit to the supply source, until the rotor has reached a speed near to the synchronous speed, thereby giving rise to the starting.

In motors in which a higher efficiency is required, the starting winding is not fully disconnected from the supply source after the starting, with a capacitor being mounted in series with this winding. This running capacitor, or permanent capacitor allows the flow of a low value current, keeps a double phase feed condition for the motor, increases its torque and substantially increases its efficiency.

For motors having such a configuration, using a permanent capacitor, there is shown a type of starting device as described in Brazilian patent document PI 201.210 consisting of a resistor having a positive temperature coefficient (PTC). This device, which is connected in series to the starting winding, has a low resistance at ambient temperature, thereby allowing the passage of a high current during the starting and which, after a predetermined time and due to a self-heating effect, presents a very high resistance, thereby practically acting as an open circuit.

During normal motor running, the voltage on the PTC is high, keeping it heated and dissipating an amount of power varying from 1.5 to 5 W or higher, depending on the ambient temperature and constructive form. Such power expended by the PTC during the entire motor running period decreases the motor efficiency, thus being undesirable.

Another known starting device is a current relay which keeps the starting coil circuit on, while the current in the main winding is high. Although it is a very simple device and practically does not consume any power during the normal motor running period, it has the disadvantage of not being useful in configurations having a permanent capacitor. This fact is due to the delays inherent to relays which cause their contacts to close when the permanent capacitor has already stored a certain amount of energy, and this energy will be dissipated over the contacts of the relay at the time it is closed, thereby quickly causing relay contact destruction.

OBJECTS OF THE INVENTION

It is a general object of the present invention to provide a device for the starting of a single phase induction motor.

It is another object to provide a device for the starting of a single phase induction motor and which can be used in conjunction with a permanent capacitor.

It is also another object to provide a device for the starting of a single phase induction motor which, in rated running condition, has no significant power consumption.

It is a further object to provide a device for the starting of a single phase induction motor which can be used in conjunction with the permanent capacitor and with a starting capacitor.

It is further another object to provide a device for the starting of a single phase induction motor which is able to overcome the above cited technical drawbacks, having a simple construction and low cost.

These objects are achieved from a starting device for a single phase induction motor, consisting of a cage type rotor and a coiled stator having at least one winding for the main coil and one winding for the starting coil.

BRIEF DESCRIPTION OF THE INVENTION

According to the present invention, the starting device for a single phase induction motor comprises an electromagnetic relay of the type having at least one normally closed contact, which is connected in series with the starting winding; an electronic timer circuit which acts to supply a flow to the coil of the relay, opening its contacts after a time interval has elapsed from the motor powering up.

Contrary to the known starting devices, the proposed device can temporarily connect the starting winding to the alternating current supply source, until the motor acceleration has occurred and without consuming a significant amount of power in the permanent running condition.

Another advantage of this starting device is that it works depending only on the time, with no need of observing other motor measurements and the consequent adjustments, which are specific for each model within the same family.

Still another advantage of the proposed device is to allow the operation in conjunction with the permanent capacitor or in conjunction with a starting capacitor and the permanent capacitor.

The device thus described is very simple and the number of components thereof is reduced.

BRIEF DESCRIPTION OF THE DRAWINGS

The invention will hereinafter be described with reference to the attached drawings, in which:

FIG. 4 illustrates another basic embodiment of the starting device using a permanent capacitor and an external impedance for the starting.

DESCRIPTION OF THE PREFERRED EMBODIMENTS

Figure 1:
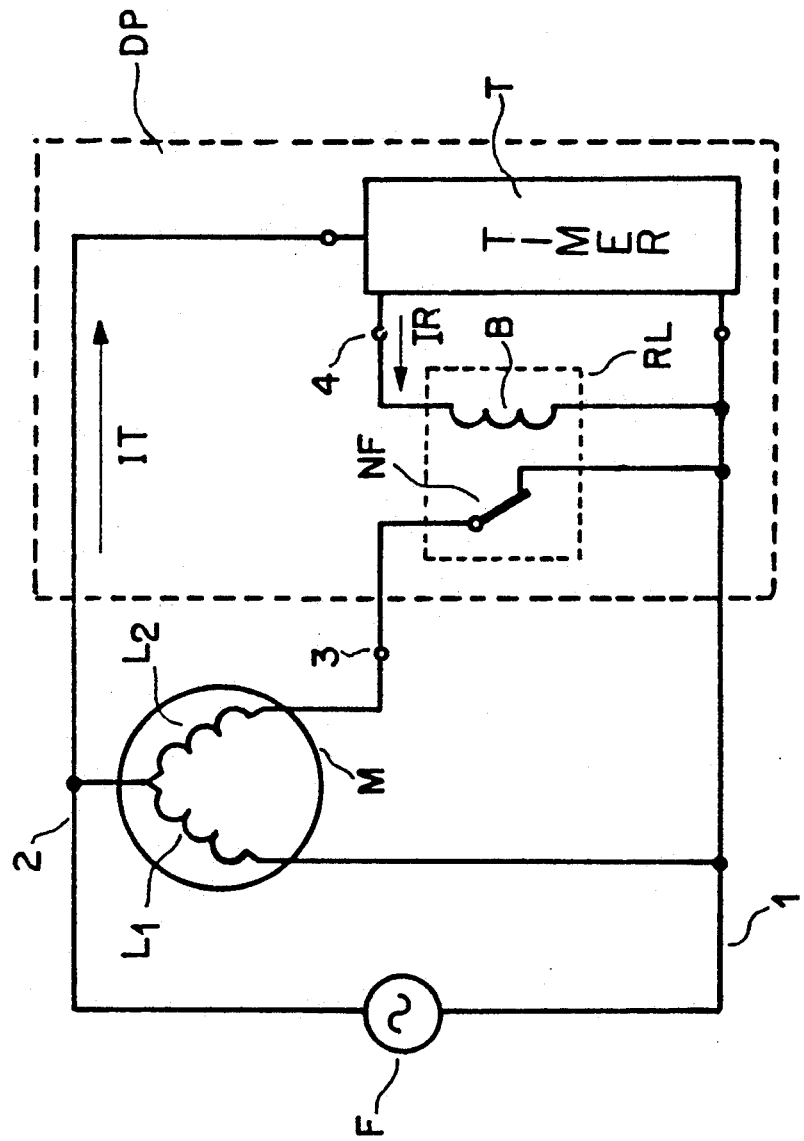
FIG. 1 illustrates the basic embodiment of the starting device.

Referring to FIG. 1, an alternating voltage source F supplies voltage to a single phase induction motor M, having a main winding L1 and a starting winding L2. The voltage supplied to the terminals 1 and 2 is directly applied to the main winding L1 and is also applied to the starting circuit formed by the starting winding L2 connected to a starting device DP.

Immediately after the motor is powered up by the voltage source F, a current begins to flow through the circuit formed by the starting winding L2, which is connected in series to the normally closed type contacts of an electromechanic relay RL of the starting device DP.

The total time that the contacts of the relay RL remain in the conduction condition during the starting of the motor M is defined by a timer T which, after a predetermined time has elapsed, causes the flow of a current IR with a magnitude sufficient to actuate the relay RL by opening its contacts, thereby completing the starting step.

During the normal running of the motor M, the coil B of the relay RL remains emerging, thereby keeping the contacts open.

Figure 2:
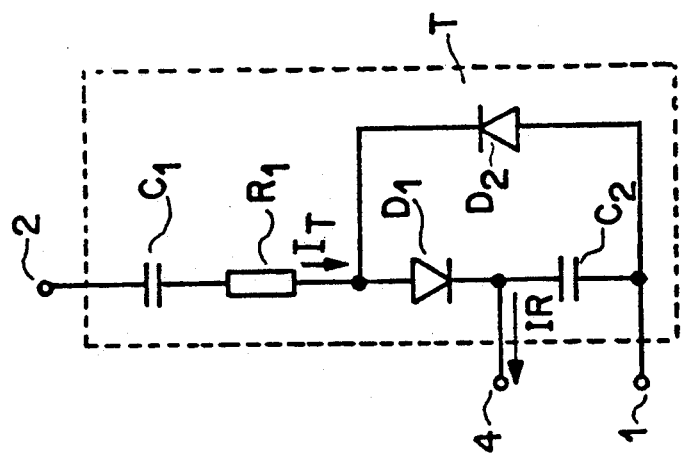
FIG. 2 illustrates one embodiment of the timer circuit of the starting device.

The timer T, in a first embodiment as shown in FIG. 2, is formed by current limiting means, rectifier means and timing capacitor means, said timer T operating as hereinafter described.

Immediately after the circuit energization, a second timing capacitor C2 is discharged. During the positive half-cycles of the voltage from the source F across terminals 1,2, a diode D1 is forward biased, thus allowing a current IT from the source F to flow towards said second capacitor C2, thereby increasing its load. In the negative half-cycles, the current IT is directed by a diode D2 directly to the source F, thereby charging the capacitor C1.

In this way, in the following positive half-cycle, a current IT will flow again through the first capacitor C1 and diode D1, thereby increasing once more the voltage on the second capacitor C2. Thus, the voltage on the second capacitor C2 gradually increases by the successive charges transmitted from the first capacitor C1 to the capacitor C2 in the positive half-cycles, until the voltage in the point 3 on the relay coil B (FIG. 1) of the relay RL is sufficient to cause the actuation thereof, by opening the contacts of the relay RL.

The time elapsed from the powering up of the motor M, until the interruption of the current conduction by the opening of the contacts of the relay RL, is basically defined by the values of the capacitors C1 and C2. The value of the first capacitor C1, which is responsible for limiting the current IT, is computed so as to supply a circuit consumption current sufficent to energize the coil B of the relay RL.

Figure 3:
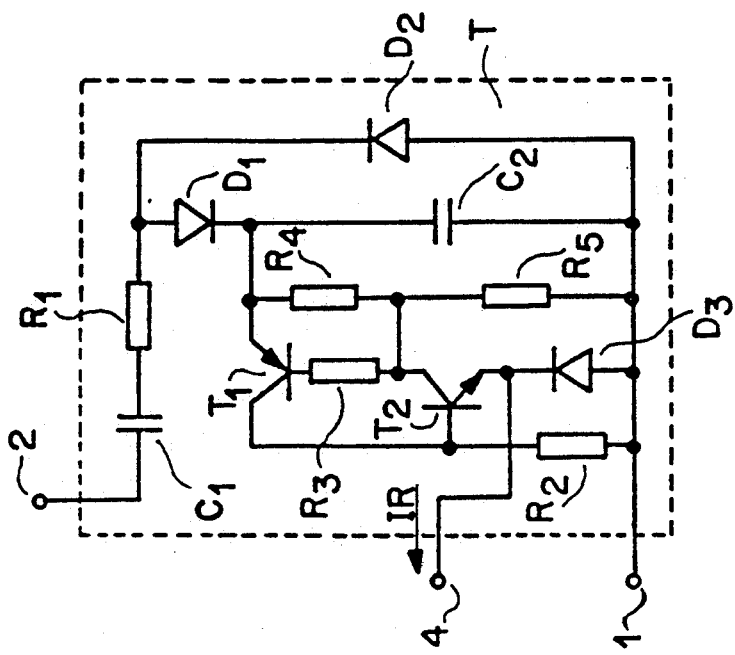
FIG. 3 illustrates another embodiment of the timer circuit.

In another embodiment, as illustrated in FIG. 3, the timer is formed by current limiting means, a rectifier, a timing capacitor and a voltage trigger, said timer operating as hereinafter described. As in the first embodiment of the timer, the voltage in a second capacitor C2 is gradually increased after the circuit energization, said voltage being also applied to a voltage divider formed by a fourth resistor R4 and a fifth resistor R5. When said voltage is sufficient to forward bias the base-emitter junction of a first transistor T1 of the PNP type, a current will flow through the collector of said transistor T1 towards the base of a second transistor T2 of the NPN type. This will allow an additional current to flow through the base of the first transistor T1, causing a positive feedback, until both transistors T1, T2 are saturated. Such effect occurs suddenly, at a voltage value defined by the relation between the fourth resistor R4 and the fifth resistor R5 and by the biasing voltage of the first transistor T1. When this trigger occurs, making both transistors saturate, the voltage on the emitter of the second transistor T2 suddenly increases, from zero to a value that is substantially close to that of the voltage on the second timing capacitor C2, making a current IR flow through the coil B of the relay RL, thereby actuating the latter and opening the contact NF.

A second resistor R2 avoids the occurrence of an undesirable trigger due to leakage currents from the second transistor T2. A third resistor R3 limits the current at the base of the first transistor T1 when it is saturated. A third diode D3 allows the flow of the current that is stored in the inductive circuit of the relay RL when the alternating current source F is cut off, thus avoiding the damage of the second transistor due to overvoltage.

The use of the first capacitor C1 as a current limiter replacing a resistor reduces the power consumption of the circuit to a minimum level.

The second capacitor C2 is designed to delay any increase in the voltage at the point 4 during the starting of the motor, by defining the time the starting device DP operates.

The first resistor RI connected in series to the second capacitor C2 works as a protecting device, thereby limiting the current IT during eventual transient voltage supplied by the voltage source F.

FIG. 4 shows, in a simplified way, the connection of the starting device for a single phase induction motor in a motor embodiment using an external impedance Ze and a permanent capacitor CP. In this embodiment, the external impedance Ze, which can be a resistor or a starting capacitor, is installed between the first terminal 1 of the alternating current source F and the normally closed terminal NF of the relay RL.

After the starting of the motor, the external impedance Ze, which is in series with the contacts NF of the relay RL of the starting device DP, will be disconnected from the circuit, and only the permanent capacitor CP will stay connected to the starting coil.

Figure 5:
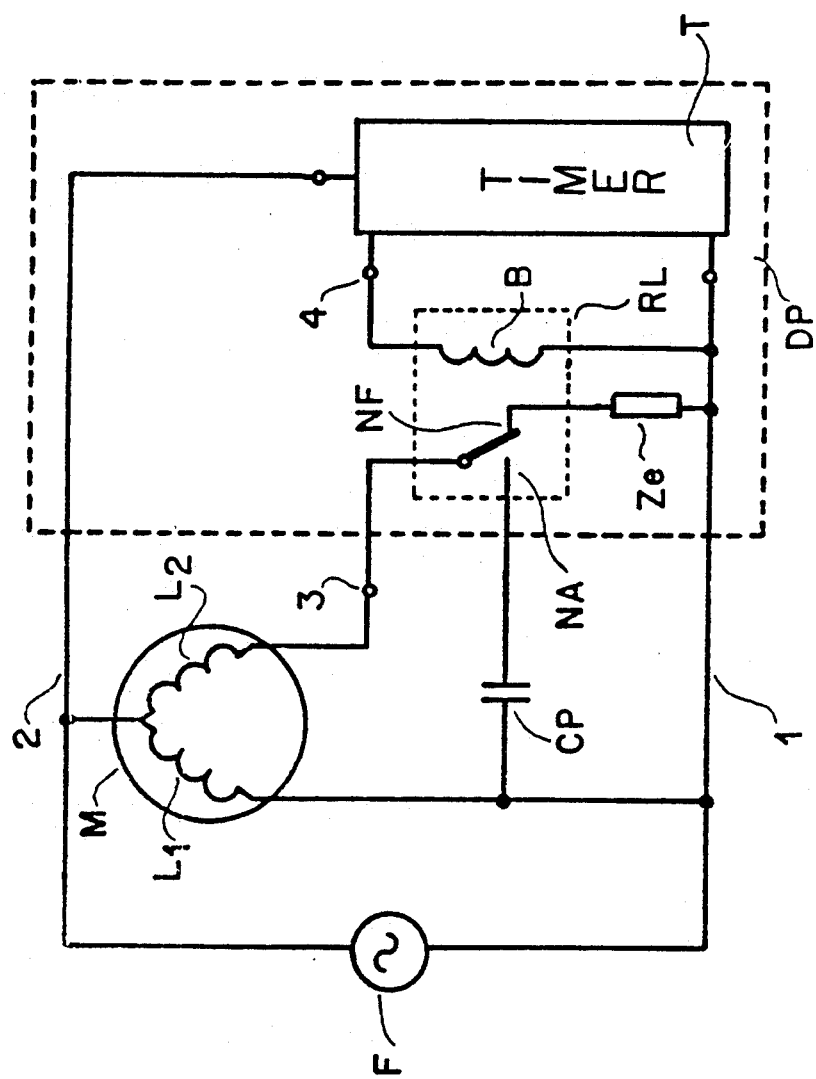
FIG. 5 illustrates another embodiment of the starting device using a bilateral switch, a permanent capacitor and an external impedance for the starting.

FIG. 5 shows another embodiment of the starting device using a bilateral switch RL, having a normally closed contact NF and a normally opened contact NA and operating as follows.

During the starting, the normally closed contact connects the starting winding L2 of the first terminal 1 of the alternating current source, optionally through a starting impedance Ze. After the starting period has elapsed, which is determined by the timer T, the bilateral switch, or bilateral relay, is actuated by opening the normally closed contact NF and closing the normally opened contact NA, thereby connecting the starting winding L2 of the first terminal of the alternating current source through the permanent capacitor CP.

As hereinabove described, the present device starts a single phase induction motor without dissipating a significant amount of power during the normal motor running and allowing it to be used in conjunction with a permanent capacitor or in conjunction with the permanent capacitor and a starting capacitor, or it can also be used individually, by temporarily connecting it to a starting coil.

We claim:

1. Starting device for a single phase induction motor, of the type having a cage type rotor and a stator with at least one main winding and one starting winding connected in series with first and second terminals of an alternating current source comprising:
   a relay having at least one contact with a pair of terminals, one of the terminals of said contact being connected to the first terminal of the alternating current source and the other terminal connected to the starting winding:
   a coil for actuating the relay;
   an electronic timer circuit connected to the coil for actuating the relay to open the relay contact by supplying a current to the coil thereof to end the starting operation of the motor after a period of time has elapsed from the motor powering up, said electronic timer circuit comprising:
   a current limiting circuit having a first terminal connected to the second terminal of the alternating current source and a second terminal;
   a rectifier circuit with an input connected to the second terminal of the current limiting circuit and an output;
   a timing capacitor having its terminals connected between the output of said rectifier circuit and the first terminal of the supply source; and
   output terminals respectively connected to the terminals of the timing capacitor and which are in turn connected to the coil for actuating the relay.

2. Starting device, as in claim 1, wherein said relay is of the type having at least one normally closed contact.

3. Starting device for a single phase induction motor, of the type having a cage type rotor and a stator with at least one main winding and one starting winding connected in series with first and second terminals of an alternating current source comprising:
   a relay having at least one contact with a pair of terminals, one of the terminals of said contact being connected to the first terminal of the alternating current source and the other terminal connected to the starting winding;
   a coil for actuating the relay;
   an electronic timer circuit connected to the coil for actuating the relay to open the relay contact by supplying a current to the coil thereof to end the starting operation of the motor after a period of time has elapsed from the motor powering up, said electronic timer circuit comprising:
   a current limiting circuit having a first terminal connected to the second terminal of the alternating current source and a second terminal;
   a rectifier circuit having an input connected to the second terminal of the current limiting circuit and an output;
   a timing capacitor connected between the output of said rectifier circuit and the first terminal of the supply source; and
   a voltage trigger circuit having input terminals connected to the first and second terminals of said timing capacitor and output terminals connected to the coil for actuating the relay.

4. Starting device, as in claim 3, wherein the voltage trigger circuit comprises:
   A first transistor of the PNP type, having its emitter connected to the point interconnecting the output of the rectifier circuit to the timing capacitor, having its collector connected to the base of a second transistor of the NPN type and to the first terminal of the alternating current source through a second resistor, and having its base connected to the collector of the second transistor through a third resistor;
   a fourth resistor interconnecting the emitter of said first transistor to the collector of the second transistor;
   a fifth resistor interconnecting the collector of the second transistor to the first terminal of the alternating current source;
   a third diode having an anode which is connected to the first terminal of the alternating current source, and a cathode, which is connected to the emitter of the second transistor; and
   output terminals connected to the emitter of the second transistor and to the first terminal of the alternating current source.

5. Starting device, according to claim 1, wherein the current limiting circuit comprises a first capacitor with a first terminal being connected to the second terminal of the alternating current source through a first resistor and with a second terminal being connected to the input of the rectifier circuit.

6. Starting device, according to claim 1 wherein the rectifier circuit comprises:
   a first diode with its anode connected to the second terminal of the current limiting circuit and with its cathode connected to the first terminal of the timing capacitor; and
   a second diode with its cathode connected to the anode of the first diode and with its anode connected to the first terminal of the alternating current source.

7. Starting device, as in claim 5, wherein the limitation of the current is predominantly provided by said first capacitor.

8. Starting device, as in claim 5, wherein said first resistor limits the current during motor starting.

9. Starting device for a single phase induction motor, of the type having a cage type rotor and a stator with at least one main winding and one starting winding connected in series with first and second terminals of an alternating current source comprising:
   a relay having at least one contact with a pair of terminals, one of the terminals of said contact being connected to the first terminal of the alternating current source and the other terminal connected to the starting winding;

a coil for actuating the relay;

an electronic timer circuit connected to the coil for actuating the relay to open the relay contact by supplying a current to the coil thereof to end the starting operation of the motor after a period of time has elapsed from the motor powering up, and an external impedance connected between the starting winding and the terminal of the normally closed contact of the relay.

10. Starting device, as in claim 9, wherein said external impedance is a resistor or a starting capacitor.

11. Starting devise, as in claim 1, further comprising a permanent capacitor connected in series between the starting winding and the first terminal of the alternating current source.

12. Starting device, as in claim 1, wherein the relay comprises a bilateral switch.

13. Starting device as in claim 12, wherein the normally closed contact of the bilateral switch connects the starting winding to the first terminal of the alternating current source.

14. Starting device, as in claim 12, wherein the normally opened contact of the relay connects the starting winding to the first terminal of the alternating current source through a permanent capacitor.

15. Starting device as in claim 12, further comprising an external impedance connected between the first terminal of the alternating current course and the normally closed contact of the bilateral switch.

16. Starting device according to claim 3, wherein the current limiting circuit comprises a first capacitor with a first terminal connected to the second terminal of the alternating current source through a first resistor and with a second terminal connected to the input of the rectifier circuit.

17. Starting device according to claim 3, wherein the rectifier circuit comprises:

a first diode, with the anode being connected to the second terminal of the current limiting circuit and with the cathode being connected to the first terminal of the timing capacitor; and a second diode with the cathode connected to the anode of the first rectifier diode the anode connected to the first terminal of the alternating current source.

18. Starting device, as in claim 3, wherein the relay comprises a bilateral switch.

19. Starting device as in claim 18, wherein the normally closed contact of the bilateral switch connects the starting winding to the first terminal of the alternating current source.

20. Starting device, as in claim 15, wherein the relay comprises a bilateral switch.

21. Starting device as in claim 20, wherein the normally closed contact of the bilateral switch connects the starting winding to the first terminal of the alternating current source.

* * * * *